(12) United States Patent
Yang et al.

(10) Patent No.: US 10,220,672 B2
(45) Date of Patent: Mar. 5, 2019

(54) THERMAL CONTROL SYSTEM OF ELECTRIC VEHICLE

(71) Applicant: ALEEES ECO ARK (CAYMAN) CO. LTD., Grand Cayman (KY)

(72) Inventors: An-Tao Anthony Yang, Taoyuan (TW); Gordon Ching Chen, Taoyuan (TW)

(73) Assignee: ALEEES ECO ARK CO. LTD., Bade (TW)

( * ) Notice: Subject to any disclaimer, the term of this patent is extended or adjusted under 35 U.S.C. 154(b) by 189 days.

(21) Appl. No.: 15/127,590

(22) PCT Filed: Mar. 20, 2015

(86) PCT No.: PCT/CN2015/074806
§ 371 (c)(1),
(2) Date: Sep. 20, 2016

(87) PCT Pub. No.: WO2015/139663
PCT Pub. Date: Sep. 24, 2015

(65) Prior Publication Data
US 2018/0170145 A1    Jun. 21, 2018

Related U.S. Application Data

(60) Provisional application No. 61/968,821, filed on Mar. 21, 2014.

(51) Int. Cl.
| | |
|---|---|
| *B60H 1/00* | (2006.01) |
| *B60H 1/14* | (2006.01) |
| *B60K 1/00* | (2006.01) |
| *B60K 11/02* | (2006.01) |
| *B60K 11/04* | (2006.01) |

(52) U.S. Cl.
CPC ..... *B60H 1/00392* (2013.01); *B60H 1/00885* (2013.01); *B60H 1/143* (2013.01);
(Continued)

(58) Field of Classification Search
CPC ........... B60H 1/00392; B60H 1/00885; B60H 1/143; B60H 1/00278; B60H 1/00371;
(Continued)

(56) References Cited

U.S. PATENT DOCUMENTS 1,591,140 A  *  7/1926  Parks ................. B60H 1/00885
                                                          236/36
6,112,543 A       9/2000  Feuerecker et al.
(Continued)

FOREIGN PATENT DOCUMENTS

CN      201863680 U     6/2011
CN      202470253 U    10/2012
(Continued)

*Primary Examiner* — Justin M Jonaitis
(74) *Attorney, Agent, or Firm* — Kirton McConkie; Even R. Witt

(57) ABSTRACT

A thermal control system of an electric vehicle is provided. The thermal control system has a composite cooling architecture. The thermal control system is automatically operated in one of three operation modes to adjust a circulation path of a cooling liquid according to the ambient temperature, the power system temperature and the cabinet air temperature. Consequently, the temperature of the power system is stabilized, the performance and the use life of the power system are enhanced, and the power consumption of the air-conditioning system is reduced.

7 Claims, 3 Drawing Sheets

(52) U.S. Cl.
CPC .............. *B60K 11/02* (2013.01); *B60K 11/04* (2013.01); *B60H 1/00278* (2013.01); *B60H 1/00371* (2013.01); *B60H 2001/00307* (2013.01); *B60H 2001/00928* (2013.01); *B60K 1/00* (2013.01); *B60K 2001/005* (2013.01); *B60K 2001/006* (2013.01)

(58) Field of Classification Search
CPC ........... B60H 2001/00307; B60H 2001/00928; B60H 1/0045; B60H 1/02; B60H 1/16; B60H 1/18; B60H 1/00364; B60H 1/00407; B60H 1/00414; B60K 11/04; B60K 1/00; B60K 2001/005; B60K 2001/006
USPC ....... 165/287, 41, 42, 43; 62/79, 324.6, 513, 62/160, 434, 335, 185, 118, 239, 243, 62/244
See application file for complete search history.

(56) References Cited

U.S. PATENT DOCUMENTS

| | | | |
|---|---|---|---|
| 6,138,466 A | * | 10/2000 | Lake ................. B60H 1/00278 429/62 |
| 2005/0133215 A1 | * | 6/2005 | Ziehr ................. B60H 1/00392 165/202 |
| 2011/0174000 A1 | * | 7/2011 | Richter .............. B60H 1/00064 62/93 |
| 2011/0197611 A1 | | 8/2011 | Hall |
| 2011/0296855 A1 | * | 12/2011 | Johnston ............... B60L 3/0046 62/79 |
| 2012/0241129 A1 | | 9/2012 | Kohl et al. |
| 2017/0028813 A1 | * | 2/2017 | Enomoto ........... B60H 1/00899 |

FOREIGN PATENT DOCUMENTS

| | | |
|---|---|---|
| CN | 103213472 A | 7/2013 |
| CN | 103342094 A | 10/2013 |
| EP | 2 392 486 A2 | 12/2011 |
| EP | 3 069 910 A2 | 9/2016 |
| EP | 3 121 043 A1 | 1/2017 |
| JP | 2002233004 A | 8/2002 |
| JP | 2011001048 A | 1/2011 |
| JP | 2013500903 A | 1/2013 |
| JP | 2014000948 A | 1/2014 |
| JP | 2014043181 A | 3/2014 |
| TW | 201226228 A | 7/2012 |
| WO | 2012161819 A1 | 11/2012 |
| WO | 2015/133083 A1 | 9/2015 |

\* cited by examiner

THERMAL CONTROL SYSTEM OF ELECTRIC VEHICLE

FIELD OF THE INVENTION

The present invention relates to a thermal control system, and more particularly to a thermal control system of an electric vehicle that is selectively operated in one of three operation modes to adjust a circulation path of a cooling liquid according to the ambient temperature, the power system temperature and the cabinet air temperature.

BACKGROUND OF THE INVENTION

Generally, the control mechanism and the operation of an electric vehicle rely on a power system. The power system comprises a motor, a motor controller, a motor driver and batteries. During the operation of the power system, heat energy (or waste heat) is generated and thus the temperature of the power system increases. The elevated temperature deteriorates the performance of the power system and reduces the use life of the power system. For cooling the power system of the electric vehicle, the electric vehicle is usually equipped with a radiator. Moreover, a cooling liquid is circulated between the power system and the radiator. Consequently, the heat from the operating power system is transferred to the cooling liquid and dissipated to the air through the radiator.

However, the cooling performance of the radiator is obviously affected by the ambient temperature. For example, as the ambient temperature increases (e.g., higher than 35 degrees Celsius), the temperature of the cooling liquid within the radiator also increases. In case that the operating power of the power system is higher, the output temperature of the cooling liquid is possibly in the range between 50 and 60 degrees Celsius after the cooling liquid passes through the power system and the temperature of the cooling liquid is reduced by the radiator. The temperature of the cooling liquid is higher than the ideal operating temperature of the power system (e.g., in the range between 5 and 40 degrees Celsius). Under this circumstance, the temperature of the power system cannot be reduced to the ideal operating temperature after the power system is cooled by the circulation of the cooling liquid of the radiator. Consequently, the performance of the internal components of the power system is possibly degraded, the output of the power system becomes unstable, and the use life of the power system is shortened. Moreover, the temperature of the power system affects the performance of the electric vehicle. For example, the electric vehicle has the optimized performance when the temperature of the power system is in the range between 5 and 40 degrees Celsius. As known, the thermal control system of the existing electric vehicle cannot be operated in both of an extreme cold condition and an extreme hot condition (e.g., in the range from minus 40 degrees Celsius and 40 degrees Celsius). That is, it is difficult for the thermal control system of the existing electric vehicle to be operated in both of the extreme cold condition and the extreme hot condition to effectively dissipate the heat of the power system and maintain the normal operation and desired performance of the power system (e.g., a motor). Generally, additional heating and cooling mechanisms can overcome the above drawbacks. However, the fabricating cost of the electric vehicle is largely increased. Therefore, there is a need of providing a cost-effective thermal control system for effectively maintaining the ideal operating temperature of the cooling liquid when the electric vehicle is operated various ambient temperatures.

Moreover, the heated airflow from the air-conditioning system of the electric vehicle is produced by converting electric energy into heat energy. When the electric vehicle is driven in an extreme cold weather, the air-conditioning system of the electric vehicle consumes much electric energy. In comparison with the conventional vehicle, the electric vehicle is more power-consuming while driving in the extreme cold weather. Moreover, after the electric vehicle is charged, the mileage reduction becomes obvious. Therefore, there is a need of providing a method and a thermal control system for efficiently increasing the energy utilization efficiency of the heated airflow when the electric vehicle is driven in the extreme cold weather.

SUMMARY OF THE INVENTION

An object of the present invention provides a thermal control system of an electric vehicle. The thermal control system is automatically operated in one of three operation modes to adjust a circulation path of a cooling liquid according to the ambient temperature, the power system temperature and the cabinet air temperature. Consequently, the temperature of the power system is stabilized, the performance and the use life of the power system are enhanced, and the power consumption of the air-conditioning system is reduced.

Another object of the present invention provides a thermal control system of an electric vehicle. When the ambient temperature increases or the power system is continuously operated in the high load condition, the temperature of the cooling liquid can be maintained at the ideal operating temperature by the thermal control system of the present invention. When the electric vehicle is driven in an extreme cold condition, the waste heat energy from the power system of the electric energy is recovered to increase the cabinet air temperature by the thermal control system of the present invention, and thus the power consumption of the air-conditioning system is reduced. Consequently, the electric vehicle can be applied to various operation conditions.

In accordance with an aspect of the present invention, there is provided a thermal control system of an electric vehicle. The thermal control system includes a flow switch, a liquid temperature adjuster, a cabinet heat exchanger, a motor cooling channel, and a radiator. The flow switch includes a first terminal, a second terminal, a third terminal and a fourth terminal. The liquid temperature adjuster includes an inlet and an outlet. The inlet of the liquid temperature adjuster is connected with the first terminal of the flow switch. An inlet of the cabinet heat exchanger is connected with the outlet of the liquid temperature adjuster. An outlet of the cabinet heat exchanger is connected with the second terminal of the flow switch. The motor cooling channel includes an inlet and an outlet. The outlet of the motor cooling channel is connected with the third terminal of the flow switch. An inlet of the radiator is connected with the fourth terminal of the flow switch. An outlet of the radiator is connected with the inlet of the motor cooling channel. The flow switch adjusts a circulation path of a cooling liquid according to an operation mode of the thermal control system. If the operation mode is a normal cooling mode, the cooling liquid from the liquid temperature adjuster is transmitted to the cabinet heat exchanger. If the operation mode is a heat recovery mode, the cooling liquid from the motor cooling channel is transmitted to the cabinet heat exchanger. If the operation mode is an assisted-cooling mode, the cooling liquid from the liquid temperature adjuster is transmitted to the motor cooling channel.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
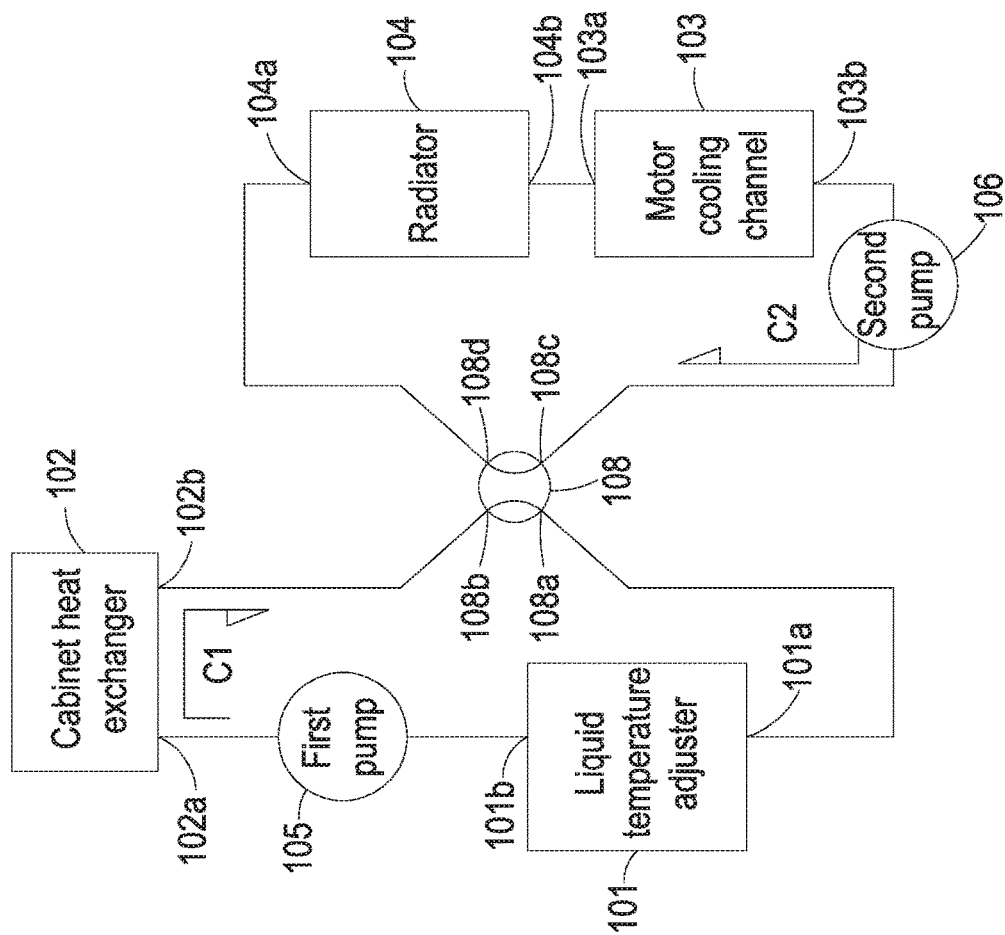
FIG. 1 schematically illustrates the architecture of a thermal control system of an electric vehicle in a normal cooling mode according to an embodiment of the present invention.
Figure 2:
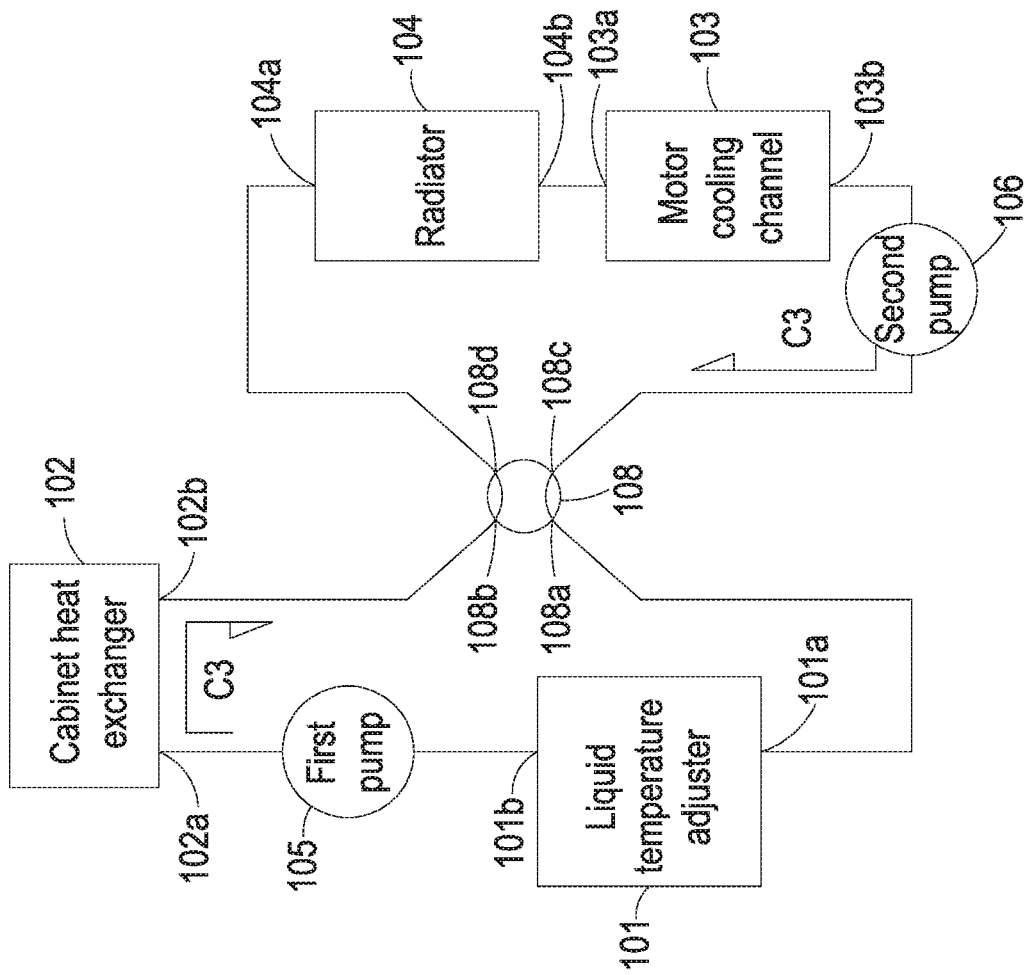
FIG. 2 schematically illustrates the architecture of the thermal control system of the electric vehicle in an assisted-cooling mode and an assisted-heating mode.
Figure 3:
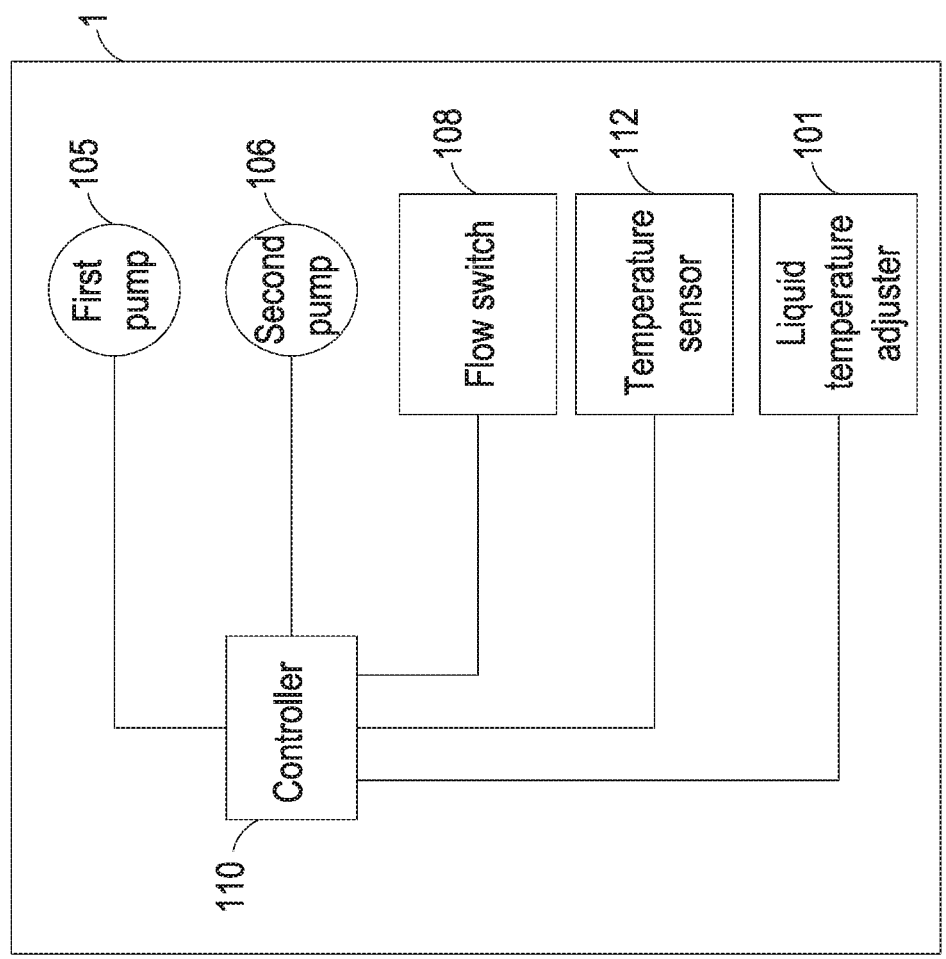
FIG. 3 is a schematic circuit block diagram of the thermal control system of the electric vehicle according to the embodiment of the present invention.

FIG. 1 schematically illustrates the architecture of a thermal control system of an electric vehicle in a normal cooling mode according to an embodiment of the present invention. FIG. 2 schematically illustrates the architecture of the thermal control system of the electric vehicle in an assisted-cooling mode and an assisted-heating mode. FIG. 3 is a schematic circuit block diagram of the thermal control system of the electric vehicle according to the embodiment of the present invention. Please refer to FIGS. 1, 2 and 3. The thermal control system 1 of the present invention is applied to a large electric vehicle. An example of the large electric vehicle includes but is not limited to an electric bus. In this embodiment, the thermal control system 1 comprises a liquid temperature adjuster 101, a cabinet heat exchanger 102, a motor cooling channel 103, a radiator 104, a first pump 105, a second pump 106, a flow switch 108 and a controller 110. The controller 110 is electrically connected with the first pump 105, the second pump 106, the flow switch 108 and the liquid temperature adjuster 101. The controller 110 is used for controlling the operations of the first pump 105, the second pump 106 and the liquid temperature adjuster 101, and controlling the switching action of the flow switch 108. The flow switch 108 is configured to distribute the cooling liquid and set the circulation path of the cooling liquid according to the operation mode of the thermal control system. For example, the operation modes of the thermal control system include a normal cooling mode, a heat recovery mode (also referred as an assisted-heating mode) and an assisted-cooling mode. Moreover, the flow switch 108 comprises a first terminal 108a, a second terminal 108b, a third terminal 108c and a fourth terminal 108d.

The liquid temperature adjuster 101 receives the cooling liquid. After the temperature of the cooling liquid is selectively adjusted by the liquid temperature adjuster 101, the cooling liquid is outputted from the liquid temperature adjuster 101. For example, the liquid temperature adjuster 101 is a water cooler with a refrigerant compression circulation unit. In some embodiments, the refrigerant compression circulation unit of the liquid temperature adjuster 101 also has a countercurrent circulation heating function for increasing the temperature of the cooling liquid. An inlet 101a of the liquid temperature adjuster 101 is connected with the first terminal 108a of the flow switch 108. An outlet 101b of the liquid temperature adjuster 101 is connected with an inlet 102a of the cabinet heat exchanger 102 through the first pump 105.

The cabinet heat exchanger 102 is heat exchanger using the cooling liquid to adjust the cabinet air temperature of the electric vehicle. The inlet 102a of the cabinet heat exchanger 102 is connected with the outlet 101b of the liquid temperature adjuster 101 through the first pump 105. An outlet 102b of the cabinet heat exchanger 102 is connected with the second terminal 108b of the flow switch 108.

The motor cooling channel 103 is a cooling circulation channel system that is installed in a power system (e.g., a motor, a motor driver, a motor controller and/or batteries) and uses the cooling liquid to absorb the waste heat. An inlet 103a of the motor cooling channel 103 is connected with an outlet 104b of the radiator 104. An outlet 103b of the motor cooling channel 103 is connected with the third terminal 108c of the flow switch 108 through the second pump 106.

The radiator 104 is used for reducing the temperature of the cooling liquid through the ambient airflow. The cooling power of the radiator 104 varies with the varying ambient temperature. For example, as the ambient temperature increases, the cooling power of the radiator 104 decreases. An inlet 104a of the radiator 104 is connected with the fourth terminal 108d of the radiator 104. The outlet 104b of the radiator 104 is connected with the inlet 103a of the motor cooling channel 103.

The first pump 105 and the second pump 106 are used for pumping the cooling liquid and controlling the flowrates of the cooling liquid. The first pump 105 is connected between the outlet 101b of the liquid temperature adjuster 101 and the inlet 102a of the cabinet heat exchanger 102. Moreover, the first pump 105 is used for driving the cooling liquid from the liquid temperature adjuster 101 to the inlet 102a of the cabinet heat exchanger 102. The second pump 106 is connected between the outlet 103b of the motor cooling channel 103 and the third terminal 108c of the flow switch 108. Moreover, the second pump 106 is used for driving the cooling liquid from the motor cooling channel 103 to the third terminal 108c of the flow switch 108.

The flow switch 108 adjusts the circulation path of the cooling liquid according to the operation mode of the thermal control system 1. If the thermal control system 1 is in the normal cooling mode, the first terminal 108a and the second terminal 108b of the flow switch 108 are in communication with each other. Consequently, the cooling liquid in the liquid temperature adjuster 101 is pumped to the inlet 102a of the cabinet heat exchanger 102 by the first pump 105. Moreover, the third terminal 108c and the fourth terminal 108d of the flow switch 108 are in communication with each other. Consequently, the cooling liquid outputted from the motor cooling channel 103 is pumped to the inlet 104a of the radiator 104 by the second pump 106. If the thermal control system 1 is in the heat recovery mode or the assisted-cooling mode, the first terminal 108a and the third terminal 108c of the flow switch 108 are in communication with each other and the second terminal 108b and the fourth terminal 108d of the flow switch 108 are in communication with each other.

In some embodiments, the thermal control system 1 of the electric vehicle further comprises plural temperature sensors 112. The temperature sensors 112 are used for sensing the ambient temperature, the cabinet air temperature and the temperature of the cooling liquid at the inlet 103a of the motor cooling channel 103.

If the thermal control system 1 of the electric vehicle is in the normal cooling mode, the flow switch 108 adjusts the circulation path of the cooling liquid. Consequently, the cooling liquid circularly flows within a first circulation path C1 and a second circulation path C2. In this embodiment, the first terminal 108a and the second terminal 108b of the flow switch 108 are in communication with each other, and the third terminal 108c and the fourth terminal 108d of the flow switch 108 are in communication with each other. Under this circumstance, the first circulation path C1 is defined by the liquid temperature adjuster 101, the first pump 105, the cabinet heat exchanger 102 and the flow switch 108 collaboratively, and the second circulation path C2 is defined by the motor cooling channel 103, the second pump 106, the flow switch 108 and the radiator 104.

If the thermal control system 1 of the electric vehicle is in the heat recovery mode or the assisted-cooling mode, the flow switch 108 adjusts the circulation path of the cooling liquid. Consequently, the cooling liquid circularly flows within a third circulation path C3. In this embodiment, the first terminal 108a and the third terminal 108c of the flow switch 108 are in communication with each other, and the second terminal 108b and the fourth terminal 108d of the flow switch 108 are in communication with each other. Under this circumstance, the third circulation path C3 is defined by the liquid temperature adjuster 101, the first pump 105, the cabinet heat exchanger 102, the flow switch 108, the radiator 104, the motor cooling channel 103 and the second pump 106 collaboratively.

The operations of the thermal control system of the present invention in three different operation modes will be described as follows. Please refer to FIG. 1 again. In case that the ambient of the electric vehicle is moderate, it is not necessary to increase the cooling power of the power system. Meanwhile, the thermal control system 1 of the electric vehicle is in the normal cooling mode. In the normal cooling mode, the cooling liquid circularly flows within the first circulation path C1 and the second circulation path C2. The first circulation path C1 and the second circulation path C2 are independent from each other. The circulating directions of the first circulation path C1 and the second circulation path C2 as shown in the arrows are opposite. Under control of the controller 110, the first terminal 108a and the second terminal 108b of the flow switch 108 are in communication with each other, and the third terminal 108c and the fourth terminal 108d of the flow switch 108 are in communication with each other. Moreover, the first pump 105 is enabled under control of the controller 110. Consequently, the cooling liquid in the liquid temperature adjuster 101 is pumped to the inlet 102a of the cabinet heat exchanger 102 by the first pump 105. That is, the cooling liquid is guided to the cabinet heat exchanger 102 to absorb the heat energy of the cabinet air to reduce the cabinet air temperature, then outputted from the outlet 102b of the cabinet heat exchanger 102 to the inlet 101a of the liquid temperature adjuster 101 through and the second terminal 108b and the first terminal 108a of the flow switch 108, and then the temperature of the cooling liquid is decreased by the liquid temperature adjuster 101. Since the cooling liquid circularly flows within the first circulation path C1, the cabinet air temperature is decreased by the cabinet heat exchanger 102 according to the user's requirements.

Moreover, the cooling liquid from the radiator 104 is received by the motor cooling channel 103. That is, the cooling liquid circularly flows within the power system to absorb the waste heat that is generated by the power system. Moreover, the second pump 106 is enabled under control of the controller 110. Consequently, the cooling liquid in the motor cooling channel 103 is guided to the third terminal 108c and the fourth terminal 108d of the flow switch 108. Then, the cooling liquid is introduced into the inlet 104a of the radiator 104, and thus the temperature of the cooling liquid is decreased by the radiator 104. After the cooling liquid is outputted from the outlet 104b of the radiator 104, the cooling liquid is sent to the inlet 103a of the motor cooling channel 103. Since the cooling liquid circularly flows within the second circulation path C2, the heat of the power system is dissipated away. That is, in the normal cooling mode, the liquid temperature adjuster 101 can provide the cooling liquid to the cabinet heat exchanger 102 to decrease the cabinet air temperature, and the motor cooling channel 103 can transfer the heated cooling liquid to the radiator 104 to decrease the temperature of the cooling liquid. Consequently, the cooling circuit can be circularly flowed at a low temperature. Since the temperature of the cooling liquid does not exceed the ideal operating temperature of the power system, the performance of the power system is enhanced.

Please refer to FIG. 2. If the ambient temperature of the electric vehicle is too high or the power system is continuously in the high load condition (or much waste heat is generated by the power system), the cooling power of the radiator 104 cannot allow the power system to be operated at the ideal operating temperature. Meanwhile, the operation mode of the thermal control system 1 of the electric vehicle is automatically switched to the assisted-cooling mode. In the assisted-cooling mode, the cooling liquid circularly flows within the third circulation path C3. Under control of the controller 110, the first terminal 108a and the third terminal 108c of the flow switch 108 are in communication with each other, and the second terminal 108b and the fourth terminal 108d of the flow switch 108 are in communication with each other. Moreover, the second pump 106 is enabled under control of the controller 110. The cooling liquid in the motor cooling channel 103 (i.e., at higher temperature) is guided to the inlet 101a of the liquid temperature adjuster 101 through the third terminal 108c and the first terminal 108a of the flow switch 108. Consequently, the temperature of the cooling liquid is decreased by the liquid temperature adjuster 101. Moreover, the first pump 105 is enabled under control of the controller 110. Consequently, the cooling liquid in the liquid temperature adjuster 101 is pumped to the cabinet heat exchanger 102 by the first pump 105. Then, the cooling liquid is introduced into the inlet 104a of the radiator 104 through the second terminal 108b and the fourth terminal 108d of the flow switch 108. After the cooling liquid is outputted from the outlet 104b of the radiator 104, the cooling liquid is sent to the inlet 103a of the motor cooling channel 103 to dissipate the heat of the power system. That is, in the assisted-cooling mode, the cooling liquid in the motor cooling channel 103 (i.e., at higher temperature) is guided to the liquid temperature adjuster 101. Consequently, the temperature of the cooling liquid is decreased by the liquid temperature adjuster 101. Since the cooling liquid circularly flows within the third circulation path C3, the temperature of the cooling liquid is decreased to the temperature lower than the ambient temperature. In other words, the temperature of the cooling liquid to be returned to the motor cooling channel 103 is maintained at the low temperature. Consequently, while the temperature of the cooling liquid is decreased, the power system is normally operated and the performance is satisfied.

Please refer to FIG. 2 again. If the ambient temperature of the electric vehicle is too low, the user may turn on the air-conditioning system of the electric vehicle to provide the heated airflow. Meanwhile, the operation mode of the thermal control system 1 of the electric vehicle is automatically switched to the heat recovery mode. In the heat recovery mode, the cooling liquid circularly flows within the third circulation path C3. Under control of the controller 110, the first terminal 108a and the third terminal 108c of the flow switch 108 are in communication with each other, and the second terminal 108b and the fourth terminal 108d of the flow switch 108 are in communication with each other. Moreover, the second pump 106 is enabled under control of the controller 110. The cooling liquid in the motor cooling channel 103 (i.e., at higher temperature) is guided to the inlet 101a of the liquid temperature adjuster 101 through the third terminal 108c and the first terminal 108a of the flow switch 108. Meanwhile, the liquid temperature adjuster 101 is disabled under control of the controller 110. Moreover, the first pump 105 is enabled under control of the controller 110. Consequently, the cooling liquid in the liquid temperature adjuster 101 is pumped to the cabinet heat exchanger 102 by the first pump 105. The cooling liquid at the higher temperature is transferred through the cabinet heat exchanger 102 to provide heat energy to the cabinet air. That is, the temperature of the cabinet is increased. After the cooling liquid is outputted from the outlet 102b of the cabinet heat exchanger 102, the cooling liquid is introduced into the inlet 104a of the radiator 104 through the second terminal 108b and the fourth terminal 108d of the flow switch 108. After the cooling liquid is outputted from the outlet 104b of the radiator 104, the cooling liquid is sent to the inlet 103a of the motor cooling channel 103 to dissipate the heat of the power system. In case that the electric vehicle is operated in an extreme cold condition, the liquid temperature adjuster 101 is enabled under control of the controller 110. Moreover, the countercurrent circulation heating function of the refrigerant compression circulation unit of the liquid temperature adjuster 101 is enabled. Consequently, the temperature of the cooling liquid from the liquid temperature adjuster 101 to the cabinet heat exchanger 102 is increased, and the cabinet air temperature is increased. That is, in the heat recovery mode, the waste heat energy of the power system is absorbed by the motor cooling channel 103 and provided to the cabinet heat exchanger 102. Consequently, the cabinet air temperature is increased. Since the cooling liquid circularly flows within the third circulation path C3, the heat of the power system is dissipated. Moreover, since the waste heat energy from the power system is recovered, the power consumption of the air-conditioning system is reduced.

From the above descriptions, the present invention provides a thermal control system of an electric vehicle. The thermal control system is automatically operated in a normal cooling mode, a heat recovery mode or an assisted-cooling mode to adjust a circulation path of a cooling liquid according to the ambient temperature, the power system temperature and the cabinet air temperature. Consequently, the temperature of the power system is stabilized, the performance and the use life of the power system are enhanced, and the power consumption of the air-conditioning system is reduced. When the ambient temperature increases or the power system is continuously operated in the high load condition, the temperature of the cooling liquid can be maintained at the ideal operating temperature by the thermal control system of the present invention. When the electric vehicle is driven in an extreme cold condition, the waste heat energy from the power system of the electric energy is recovered to increase the cabinet air temperature by the thermal control system of the present invention, and thus the power consumption of the air-conditioning system is reduced. Consequently, the electric vehicle can be applied to various operation conditions.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A thermal control system of an electric vehicle, comprising:
  a flow switch comprising a first terminal, a second terminal, a third terminal and a fourth terminal;
  a liquid temperature adjuster comprising an inlet and an outlet, wherein the inlet of the liquid temperature adjuster is connected with the first terminal of the flow switch, and the temperature of a cooling liquid is selectively increased and decreased by the liquid temperature adjuster;
  a cabinet heat exchanger using the cooling liquid to increase and decrease the cabinet air temperature of the electric vehicle, wherein an inlet of the cabinet heat exchanger is connected with the outlet of the liquid temperature adjuster, and an outlet of the cabinet heat exchanger is connected with the second terminal of the flow switch;
  a motor cooling channel comprising an inlet and an outlet, wherein the outlet of the motor cooling channel is connected with the third terminal of the flow switch; and
  a radiator, wherein an inlet of the radiator is connected with the fourth terminal of the flow switch, and an outlet of the radiator is connected with the inlet of the motor cooling channel,
  wherein the flow switch adjusts a circulation path of the cooling liquid according to an operation mode of the thermal control system, wherein when the operation mode is a normal cooling mode, the cooling liquid from the liquid temperature adjuster is transmitted to the cabinet heat exchanger, wherein when the operation mode is a heat recovery mode, the cooling liquid from the motor cooling channel is transmitted to the cabinet heat exchanger, wherein when the operation mode is an assisted-cooling mode, the cooling liquid from the liquid temperature adjuster is transmitted to the motor cooling channel.

2. The thermal control system of the electric vehicle according to claim 1, further comprising:
  a first pump connected between the outlet of the liquid temperature adjuster and the inlet of the cabinet heat exchanger for driving the cooling liquid; and
  a second pump connected between the outlet of the motor cooling channel and the third terminal of the flow switch for driving the cooling liquid.

3. The thermal control system of the electric vehicle according to claim 2, wherein the thermal control system further comprises a controller, and the controller is electrically connected with the first pump, the second pump, the flow switch and the liquid temperature adjuster for controlling operations of the first pump, the second pump and the liquid temperature adjuster and controlling a switching action of the flow switch.

4. The thermal control system of the electric vehicle according to claim 2, wherein if the thermal control system is in the normal cooling mode, the first terminal and the second terminal of the flow switch are in communication with each other, the third terminal and the fourth terminal of the flow switch are in communication with each other, the first pump is enabled, and the cooling liquid circularly flows within a first circulation path that is defined by the liquid temperature adjuster, the first pump, the cabinet heat exchanger and the flow switch collaboratively.

5. The thermal control system of the electric vehicle according to claim 4, wherein if the thermal control system is in the normal cooling mode, the second pump is enabled, and the cooling liquid circularly flows within a second circulation path that is defined by the motor cooling channel, the second pump, the flow switch and the radiator collaboratively.

6. The thermal control system of the electric vehicle according to claim 2, wherein if the thermal control system is in the assisted-cooling mode, the first terminal and the third terminal of the flow switch are in communication with each other, the second terminal and the fourth terminal of the flow switch are in communication with each other, the first pump and the second pump are enabled, and the cooling liquid circularly flows within a third circulation path that is defined by the motor cooling channel, the second pump, the flow switch, the liquid temperature adjuster, the first pump, the cabinet heat exchanger and the radiator collaboratively, wherein a temperature of the cooling liquid is decreased after the cooling liquid is outputted from the liquid temperature adjuster.

7. The thermal control system of the electric vehicle according to claim 2, wherein if the thermal control system is in the heat recovery mode, the first terminal and the third terminal of the flow switch are in communication with each other, the second terminal and the fourth terminal of the flow switch are in communication with each other, the first pump and the second pump are enabled, and the cooling liquid circularly flows within a third circulation path that is defined by the motor cooling channel, the second pump, the flow switch, the liquid temperature adjuster, the first pump, the cabinet heat exchanger and the radiator collaboratively, wherein the liquid temperature adjuster is disabled, or a temperature of the cooling liquid is increased after the cooling liquid is outputted from the liquid temperature adjuster.

* * * * *